(12) United States Patent
Batra et al.

(10) Patent No.: US 10,114,854 B2
(45) Date of Patent: Oct. 30, 2018

(54) VALIDATION RULE MANAGEMENT ACROSS ENTITIES

(71) Applicant: International Business Machines Corporation, Armonk, NY (US)

(72) Inventors: Vishal Singh Batra, Noida (IN); Pralhad Dinesh Deshpande, Bengaluru (IN)

(73) Assignee: International Business Machines Corporation, Armonk, NY (US)

(*) Notice: Subject to any disclaimer, the term of this patent is extended or adjusted under 35 U.S.C. 154(b) by 358 days.

(21) Appl. No.: 14/985,477

(22) Filed: Dec. 31, 2015

(65) Prior Publication Data

US 2017/0139977 A1  May 18, 2017

(30) Foreign Application Priority Data

Nov. 17, 2015 (IN) .......................... 6194/CHE/2015

(51) Int. Cl.
*G06F 17/30* (2006.01)
*G06Q 40/00* (2012.01)

(52) U.S. Cl.
CPC .. *G06F 17/30371* (2013.01); *G06F 17/30575* (2013.01); *G06Q 40/12* (2013.12)

(58) Field of Classification Search
CPC ................................................ G06F 17/30371
See application file for complete search history.

(56) References Cited

U.S. PATENT DOCUMENTS

| 2005/0080717 | A1 | 4/2005 | Belyi et al. |
| 2009/0182672 | A1 | 7/2009 | Doyle |
| 2015/0379510 | A1* | 12/2015 | Smith ............... G06Q 20/3829 705/71 |

OTHER PUBLICATIONS

Nakamoto, Satoshi, "Bitcoin: A Peer-to-Peer Electronic Cash System", Oct. 31, 2008, 18 pages, Copy available at: www.cryptovest.co.uk.
Schwartz, David et al., "The Ripple Protocol Consensus Algorithm", Ripple Labs Inc., 2014, 8 pages, Ripple Labs Inc.
Mazieres, David, "The Stellar Consensus Protocol: A Federated Model for Internet-level Consensus", Draft version of Oct. 8, 2015, 32 pages, Stellar Development Foundation.

(Continued)

*Primary Examiner* — Syed H Hasan
(74) *Attorney, Agent, or Firm* — Ference & Associates LLC (57) ABSTRACT

One embodiment provides a method of automatically managing a validation rule across a shared replicated database, the method including: utilizing at least one processor to execute computer code that performs the steps of: receiving, at a database, a first transaction associated with a user, wherein the database is associated with a node of a network comprising a plurality of nodes and wherein each of the plurality of nodes is associated with a different entity; the database being shared and replicated among the plurality of nodes; receiving, at the database, a validation rule associated with the first transaction, wherein the validation rule comprises at least one condition associated with the user; and automatically replicating the validation rule throughout the plurality of nodes. Other aspects are described and claimed.

20 Claims, 3 Drawing Sheets

(56) References Cited

OTHER PUBLICATIONS

Lamport, Leslie, "Paxos Made Simple", Nov. 1, 2001, 14 pages, Microsoft Research. Copy available at http://research.microsoft.com/en-us/um/people/lamport/pubs/paxos-simple.pdf.

Castro, Miguel et al., "Practical Byzantine Fault Tolerance", Proceedings of the Third Symposium on Operating Systems Design and Implementation, New Orleans, Louisiana, USA, Feb. 1999, 14 pages.

Ongaro, Diego et al., "In Search of an Understandable Consensus Algorithm", Proceedings of USENIX ATC 2014: 2014 USENIX Annual Technical Conference, Philadelphia, PA, USA, Jun. 19-20, 2014, 16 pages, USENIX.

\* cited by examiner

VALIDATION RULE MANAGEMENT ACROSS ENTITIES

BACKGROUND

Entities (e.g., corporations, institutions, departments, etc.) may have common customers or users. For example, a person may be a customer of multiple banks. Generally, these entities are separate and have no knowledge of transactions between another entity and the common customer. This may result in common customers taking advantage of the unshared knowledge, especially in financial institutions. For example, a customer may borrow money from multiple financial institutions within a short period of time before the institutions are aware of the customer's borrowing from other institutions. Such borrowing could result in a greater risk that the customer is unable to repay the financial obligation to all the lending institutions.

BRIEF SUMMARY

In summary, one aspect of the invention provides a method of automatically managing a validation rule across a shared replicated database, the method comprising: utilizing at least one processor to execute computer code that performs the steps of: receiving, at a database, a first transaction associated with a user, wherein the database is associated with a node of a network comprising a plurality of nodes and wherein each of the plurality of nodes is associated with a different entity; the database being shared and replicated among the plurality of nodes; receiving, at the database, a validation rule associated with the first transaction, wherein the validation rule comprises at least one condition associated with the user; and automatically replicating the validation rule throughout the plurality of nodes.

Another aspect of the invention provides an apparatus for automatically managing a validation rule across a shared replicated database, the apparatus comprising: at least one processor; and a computer readable storage medium having computer readable program code embodied therewith and executable by the at least one processor, the computer readable program code comprising: computer readable program code that receives, at a database, a first transaction associated with a user, wherein the database is associated with a node of a network comprising a plurality of nodes and wherein each of the plurality of nodes is associated with a different entity; the database being shared and replicated among the plurality of nodes; computer readable program code that receives, at the database, a validation rule associated with the first transaction, wherein the validation rule comprises at least one condition associated with the user; and computer readable program code that automatically replicates the validation rule throughout the plurality of nodes.

An additional aspect of the invention provides a computer program product for automatically managing a validation rule across a shared replicated database, the computer program product comprising: a computer readable storage medium having computer readable program code embodied therewith, the computer readable program code comprising: computer readable program code that receives, at a database, a first transaction associated with a user, wherein the database is associated with a node of a network comprising a plurality of nodes and wherein each of the plurality of nodes is associated with a different entity; the database being shared and replicated among the plurality of nodes; computer readable program code that receives, at the database, a validation rule associated with the first transaction, wherein the validation rule comprises at least one condition associated with the user; and computer readable program code that automatically replicates the validation rule throughout the plurality of nodes.

A further aspect of the invention provides a method of automatically managing a validation rule across a shared replicated financial ledger, the method comprising: utilizing at least one processor to execute computer code that performs the steps of: receiving, at a financial ledger, a first request for a financial obligation associated with a user and a first entity, wherein the financial ledger is on a node of a network comprising a plurality of nodes and wherein each of the plurality of nodes is associated with a different entity; the financial ledger being shared and replicated among the plurality of nodes; receiving, at the financial ledger, a validation rule associated with the first financial transaction, wherein the validation rule comprises at least one financial condition associated with the user; automatically replicating the validation rule throughout the plurality of nodes; receiving a second request for a financial obligation associated with the user and a second entity for input to the financial ledger; comparing the received second financial transaction to the validation rule, wherein the comparing comprises identifying if the at least one financial condition is fulfilled; and approving the second financial transaction if the validation rule is upheld.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Some entities are at risk for customers taking advantage of delayed transaction posting times. For example, financial institutions (e.g., banks, lending institutions, credit companies, digital currency companies, etc.) may be at risk from customers taking advantage of a delay in transaction posting times to perform multiple transactions using the same money. As an example, a customer may have one-hundred dollars in an online digital currency account. Due to a delay in posting times, a customer may be able to perform multiple transactions spending the same one-hundred dollars before the digital currency company updates the account balance.

Additionally, these entities may be at risk for customers taking advantage of unshared knowledge between similar entities. For example, financial institutions (e.g., banks, lending institutions, credit companies, digital currency companies, etc.) may have common customers and would find information regarding these common customers to be helpful when undertaking financial obligations with the common customers. As an example, a customer may access multiple banks and borrow money. Due to the unshared knowledge, the second bank lending money to the customer may not know of the loan made to the customer by the first bank, and may therefore lend the customer more money than the customer has the ability to pay back.

To prevent common customers from taking advantage of delayed posting times and unshared knowledge, some institutions have implemented shared replicated ledgers for processing transactions. Within a shared replicated ledger, each customer has a unique identification number. Using a shared replicated ledger, each entity enters transactions for the customer using the unique identification number. The ledger and transactions may then be replicated to each entity on the network using the ledger. This allows each entity to have knowledge of the shared transaction history for the common customer, which may prevent some common issues.

Another way to prevent attacks by customers is to validate each transaction before it is approved. An attack may be a customer attempting to perform transactions which are fraudulent or provide a benefit to the customer at the expense of the entity. For example, one type of attack is a double spending attack. In such an attack the customer spends the same money more than once. To assist in preventing attacks by a common customer when adding the transaction to the shared ledger a validation rule may also be created which indicates that the money has already been spent. Generally such validation rules are created and validated by a third-party validation service.

As each entity provides a transaction, the validation service validates the transaction and creates a validation rule. One problem with such an approach is that the validation takes additional time due the fact that it must go through a third-party. Additionally, the third-party validation service requires a fee for performing the service which is paid by the entity requesting the service. Another problem with this approach is that the entity is no longer responsible for the validation process. Rather, the third-party validation service is in control of the validation process. Additionally, each validation rule is static and requires the validation service to add and remove the validation rule. The adding and removing of the validation rules are generally not done at the time a transaction is completed, but rather at a later time, for example, during the validation process. In addition, the validation rules are generally not updated very frequently and may be separate from the shared ledger. As such, the validation rules may not be automatically replicated between the different nodes (e.g., the financial entities, validation services, etc.) on the network having the shared ledger. As discussed above, this still leaves the entities open to attacks by the customer.

Accordingly, an embodiment provides a method of dynamically and automatically managing validation rules across a shared database. An embodiment provides that when a transaction is added to the ledger, a validation rule is created or received and added to the ledger. This allows the entity themselves to have control over the validation rules. The validation rule is then automatically replicated and shared among the nodes having the shared replicated ledger. When the same or another entity receives a second transaction from the common customer, an embodiment validates the transaction against the validation rule. Upon determining the validation rule has been fulfilled, an embodiment may approve the second transaction. Alternatively, if the validation rule has been violated, an embodiment may deny the second transaction.

Such a system provides a technical improvement to current systems for digital transactions in that attacks by common customers can be prevented. For example, over borrowing attacks by common customers can be prevented. In an over borrowing attack, a customer borrows money from multiple institutions in a short period of time before knowledge can be shared among the institutions, for example, through the use of a credit report. In such an attack, the customer borrows more money than a single institution would have been willing to lend the customer based upon credit and trustworthiness factors. By allowing the customer to borrow money from multiple institutions, the risk of the customer defaulting becomes very high. Such attacks are possible due to the digital nature of the transactions. By adding validation rules at the same time as the transaction and automatically replicating the validation rules among the shared ledger participants, the system as described herein prevents the customer from being able to borrow money from the multiple institutions. Also, by adding the validation rules at the same time as opposed to before the transaction is inserted on the ledger, the customer is treated fairly in that the customer is not at the mercy of the entity to remove the rule if the transaction is not completed.

For ease of understanding, the example of financial institutions and transactions will be used throughout this disclosure. However, as can be understood by one skilled in the art, the systems and methods as described herein can be applied to other entities and transactions which entities may want to share. As an example, the systems and methods as described herein could be applied to an application where a user borrows products (e.g., tools, books, cars, etc.) that can be borrowed from multiple entities or locations.

Figure 1:
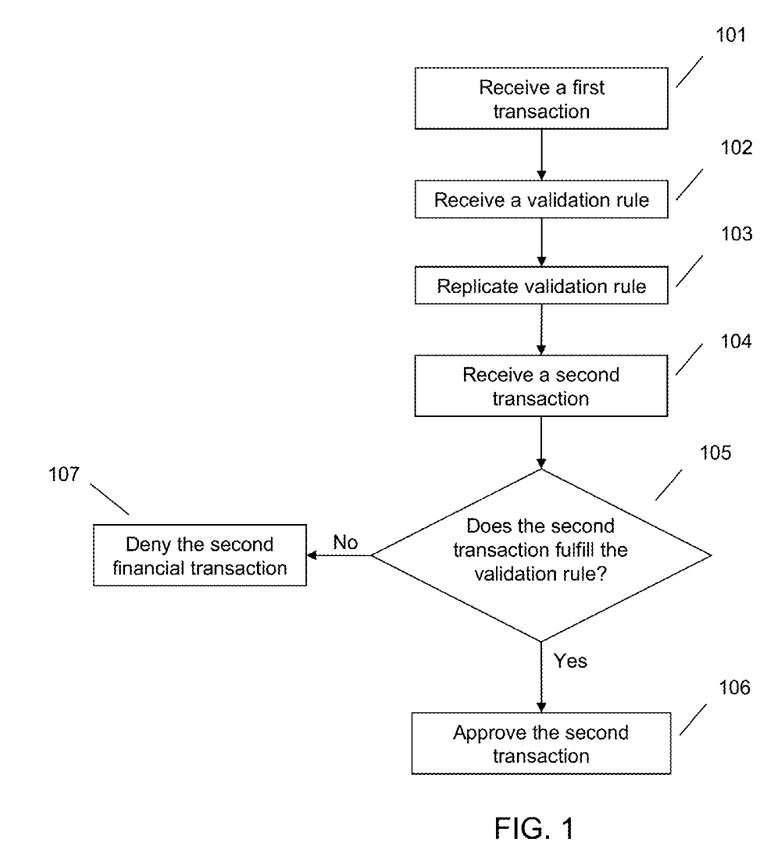
FIG. 1 illustrates a method of validation rule management across entities.
Figure 2:
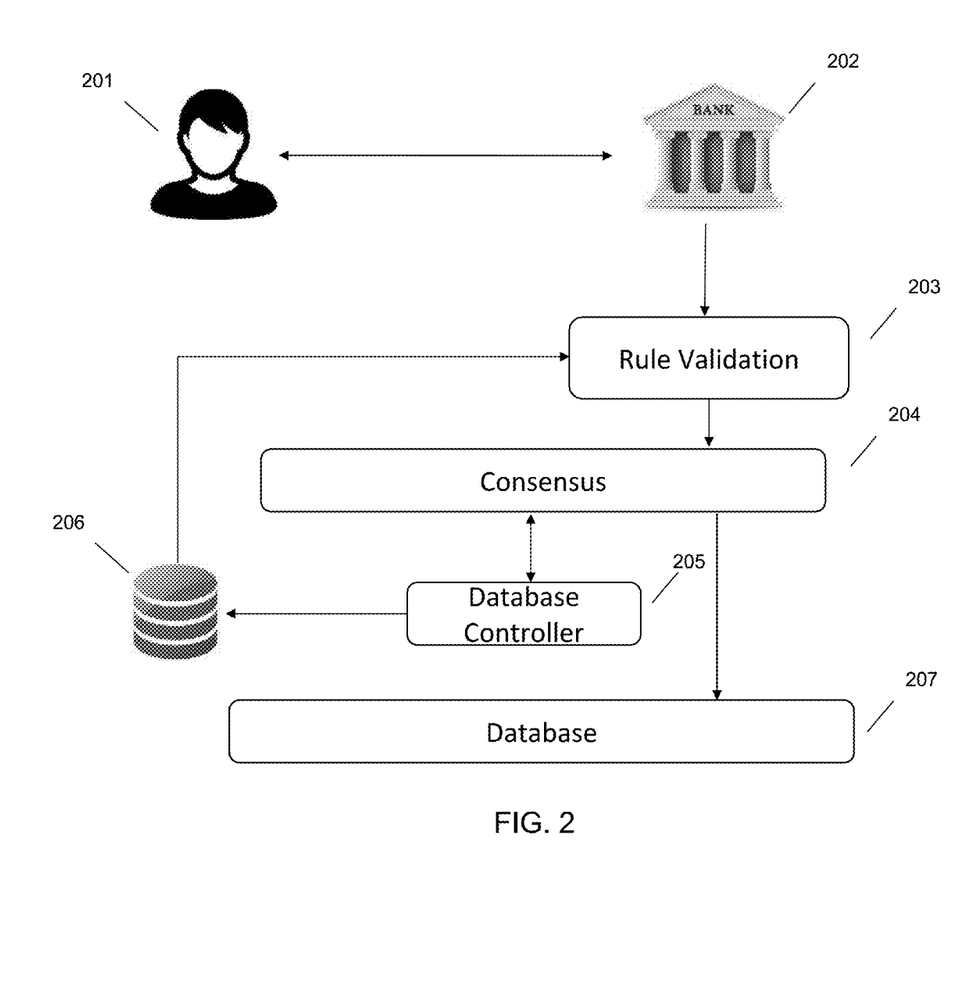
FIG. 2 schematically illustrates an exemplary communication channel between entities.

Referring now to FIG. 1, at 101 an embodiment may receive at a database (for example, a database, financial ledger, and the like) a first transaction associated with a user. The database may be associated with (e.g., stored at, contained within, accessible by, etc.) a node on a network having a plurality of nodes, each of the nodes being associated with a different entity. For example, the database may be a shared financial ledger and each financial institution communicates with or is connected to other financial institutions by a network. Each of the financial institutes may be considered a node of the network. In a shared ledger system, each entity has access to a ledger. As an entity updates the ledger, the ledger is replicated among the other nodes in the network. Such a system provides a shared ledger which is accessible and updatable by each entity but which is substantially up-to-date with any and all transactions completed at any of the entities on the network. The system then provides a database which is shared and replicated among the plurality of nodes on the network.

A transaction may include a variety of transactions performed by an entity associated with a user. For example, in a financial setting, a transaction may include a user making a payment, requesting money, earning interest, buying a product, selling a product, and the like. In a shared database system, the user may be identified within the system using an identification method unique to the user, for example, the user may be identified using a number, biometric data, and the like. When the transaction is included in the shared database, the transaction may include information regarding the type of transaction (e.g., loan, payment, interest, debit, credit, etc.), amount of the transaction, the entity where the transaction was completed, and the like.

At 102, an embodiment may receive a validation rule associated with the first transaction received at 101. The validation rule may be received in conjunction with the transaction. For example, a message from the entity may include both the transaction and validation rule, ensuring that both get added atomically to the shared database. The validation rule may include at least one condition associated with the user. For example, if in the first transaction the user is requesting to borrow money from a bank, the validation rule may include a financial condition, for example, that the user cannot borrow more than a particular amount of money. As another example, the validation rule may include a timeframe for which the user cannot borrow more money. The validation rule may also include terms associated with the transaction or other information which may be useful to other entities. The validation rule may be used to help reduce the risk that a customer may pose to an entity.

The validation rule may be atomically (e.g., at the same time, at substantially the same time, etc.) inserted in the database along with the transaction. In other words, if a bank determines that they are only comfortable with the customer borrowing a particular amount of money, the bank can include, for example, within the same message, this information as a validation rule while inserting the transaction into the shared database. The validation rule may also include signatures from the user and the entity. For example, the entity may require that the user acknowledge, via a signature, that the validation rule is going to be entered into the shared database.

At 103, an embodiment may replicate the validation rule and transaction throughout the plurality of nodes. This replication may be automatically completed without user input. For example, the replication may be included in the replication and sharing of the shared database as described above. The replication will then allow other entities which share the database to see the transaction and the validation rule associated with the transaction and thereby associated with the user.

An embodiment may receive a second transaction associated with a user at 104. In one embodiment the entity receiving the first transaction and the entity receiving the second transaction may be different entities. For example, a user may make a request for a financial obligation (i.e., a loan, credit card, line of credit, etc.) at a credit union. The credit union may determine that the user can borrow the requested loan amount of forty-thousand dollars but is not allowed to borrow more than fifty-thousand dollars. The credit union may insert the transaction for forty-thousand dollars and the validation rule of no more than fifty-thousand dollars into the shared database. Referring to FIG. 2, the user 201 may then perform a second transaction, for example, requesting a loan in the amount of twenty-five thousand dollars at a bank 202.

Upon receiving the second transaction at 104, an embodiment may determine if the second transaction fulfills the validation rule at 105. In making the determination, an embodiment may parse the second transaction and may additionally parse the location where the validation rules are stored. The determination may include comparing the second transaction to the validation rule, for example, comparing the parsed text of the second transaction to the parsed text of the validation rule. The determination may identify whether the condition of the validation rule is fulfilled.

Using the example above, the second transaction may be sent to a rule validation engine 203, which is used to validate the second transaction. The rule validation engine 203 may communicate with a consensus layer 204 which may communicate with a database controller 205 to access the validation rule database 206. The consensus layer 204 may be used to compare the transaction with the validation rule contained with the validation rule database 206. The consensus layer 204 may also communicate with the shared database 207. For example, if the second transaction is approved the consensus layer 204 may write the second transaction and any additional validation rule associated with the second transaction to the shared database 207. In the example above, the system may identify that the validation rule says no more than fifty-thousand and the user has already borrowed forty-thousand which means the user can only borrow ten-thousand more dollars.

In one embodiment, a validation rule database may not exist. Rather, the validation rules may be included in the shared database. However, a validation rule database being separate from the shared database allows a performance improvement in that the system will not have to parse the entire shared database to find the applicable validation rules. Alternatively, the shared database may have a separate section for validation rules so that the system would only access the separate section. The validation rules may also be designated differently so an embodiment may just look for the validation rule designation in order to more quickly locate the validation rules.

If the validation rule is upheld at 105, an embodiment may approve the second transaction at 106. If, however, the validation rule is violated at 105, an embodiment may deny the transaction at 107, which may occur in the example above. In denying the transaction, an embodiment may also provide additional information. Using the example above, the system may deny the transaction and additionally provide the amount that the user is allowed to borrow. In approving or denying the transaction, an embodiment may provide output to the user, for example, using a display device, using a computer peripheral (e.g., printer, fax machine, etc.), and the like, in the form of a prompt, highlighting, print out, and the like. One embodiment may also provide the appropriate documents if a transaction is approved. For example, if a loan request is approved, the system may interact with other systems to open, populate, and/or complete the loan documents necessary for signatures.

In managing the validation rules, an embodiment may also remove validation rules upon the satisfaction or fulfillment of at least one term associated with a transaction associated with a validation rule. The removal of a validation rule may also be automatically replicated among the plurality of nodes. For example, if a user has borrowed money, upon repayment of the money and fulfillment of the terms of the loan agreement, the validation rule may be removed. The validation rule may also be dynamically changed. For example, if a user increases their income, the validation rule may indicate that the user can borrow more money than originally allowed.

Figure 3:
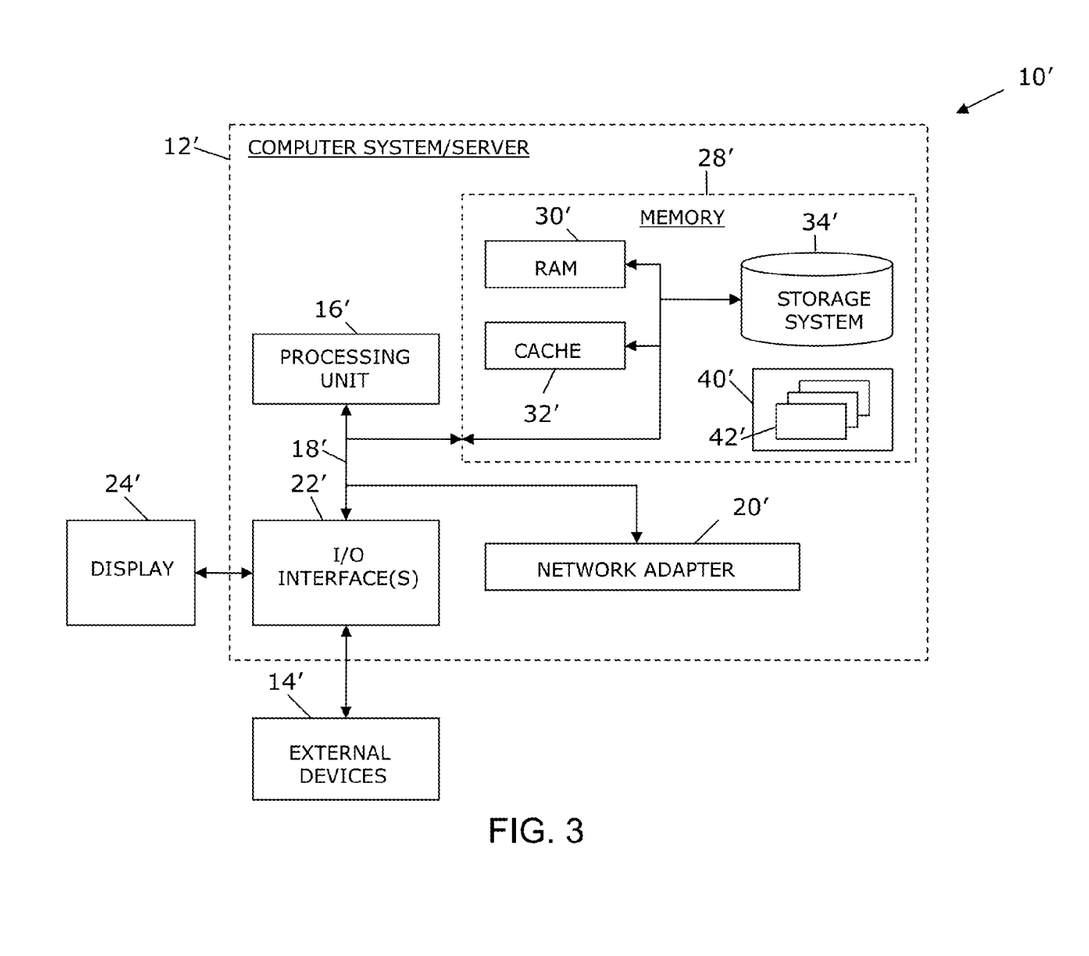
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of automatically managing a validation rule across a shared replicated database, the method comprising:

utilizing at least one processor to execute computer code that performs the steps of:
receiving, at a ledger of at a database comprising a shared financial ledger, a first transaction associated with a user, wherein the database comprises a plurality of ledgers, each ledger being associated with a node of a network comprising a plurality of nodes and wherein each of the plurality of nodes is associated with a different entity;
the database being shared and replicated among the plurality of nodes;
receiving, at substantially the same time as the first transaction and at the ledger, a validation rule for preventing a financial attack and associated with the first transaction, wherein the validation rule comprises at least one condition associated with the user with respect to the first transaction and wherein the validation rule is generated by the entity associated with the ledger; and
automatically replicating, response to receipt of the first transaction and the validation rule at the ledger, the validation rule throughout the plurality of ledgers.

2. The method of claim 1, comprising:
receiving, at an entity, a second transaction associated with the user; and
comparing the received second transaction to the validation rule.

3. The method of claim 2, wherein the first transaction and the second transaction are associated with different entities.

4. The method of claim 2, wherein the comparing comprises identifying if the at least one condition is fulfilled.

5. The method of claim 2, comprising approving the second transaction if the validation rule is upheld.

6. The method of claim 2, comprising denying the second transaction if the validation rule is violated.

7. The method of claim 1, comprising:
removing from the database the validation rule upon fulfillment of at least one term associated with the first transaction; and
automatically removing the validation rule from the plurality of nodes.

8. The method of claim 1, wherein the first transaction comprises a request for a financial obligation from the user and wherein the validation rule comprises financial conditions based upon a receipt of the financial obligation.

9. The method of claim 8, comprising removing the validation rule from the database upon fulfillment of the financial obligation.

10. The method of claim 9, comprising automatically removing the validation rule from the plurality of nodes.

11. An apparatus for automatically managing a validation rule across a shared replicated database, the apparatus comprising:
at least one processor; and
a computer readable storage medium having computer readable program code embodied therewith and executable by the at least one processor, the computer readable program code comprising:
computer readable program code that receives, at a ledger of at a database comprising a shared financial ledger, a first transaction associated with a user, wherein the database comprises a plurality of ledgers, each ledger being associated with a node of a network comprising a plurality of nodes and wherein each of the plurality of nodes is associated with a different entity;
the database being shared and replicated among the plurality of nodes;
computer readable program code that receives, at substantially the same time as the first transaction and at the ledger, a validation rule for preventing a financial attack and associated with the first transaction, wherein the validation rule comprises at least one condition associated with the user with respect to the first transaction and wherein the validation rule is generated by the entity associated with the ledger; and
computer readable program code that automatically replicates, in response to receipt of the first transactions and the validation rule at the ledger, the validation rule throughout the plurality of ledgers.

12. A computer program product for automatically managing a validation rule across a shared replicated database, the computer program product comprising:
a computer readable storage medium having computer readable program code embodied therewith, the computer readable program code comprising:
computer readable program code that receives, at a ledger of at a database comprising a shared financial ledger, a first transaction associated with a user, wherein the database comprises a plurality of ledgers, each ledger being associated with a node of a network comprising a plurality of nodes and wherein each of the plurality of nodes is associated with a different entity;
the database being shared and replicated among the plurality of nodes;
computer readable program code that receives, at substantially the same time as the first transaction and at the ledger, a validation rule for preventing a financial attack and associated with the first transaction, wherein the validation rule comprises at least one condition associated with the user with respect to the first transaction and wherein the validation rule is generated by the entity associated with the ledger; and
computer readable program code that automatically replicates, in response to receipt of the first transactions and the validation rule at the ledger, the validation rule throughout the plurality of ledgers.

13. The computer readable program product of claim 12, wherein the computer readable program code comprises:
computer readable program code that receives, at an entity, a second transaction associated with the user; and
computer readable program code that compares the received second transaction to the validation rule.

14. The computer readable program product of claim 13, wherein the first transaction and the second transaction are associated with different entities.

15. The computer readable program product of claim 13, wherein the computer readable program code that compares comprises identifying if the at least one condition is fulfilled.

16. The computer readable program product of claim 13, wherein the computer readable program code comprises computer readable program code that approves the second transaction if the validation rule is upheld.

17. The computer readable program product of claim 13, wherein the computer readable program code comprises computer readable program code that denies the second transaction if the validation rule is violated.

18. The computer readable program product of claim 12, wherein the computer readable program code comprises:
computer readable program code that removes, from the database, the validation rule upon fulfillment of at least one term associated with the first transaction; and
computer readable program code that automatically removes the validation rule from the plurality of nodes.

19. The computer readable program product of claim 12, wherein the first transaction comprises a request for a financial obligation from the user and wherein the validation rule comprises financial conditions based upon a receipt of the financial obligation.

20. A method of automatically managing a validation rule across a shared replicated financial ledger, the method comprising:

utilizing at least one processor to execute computer code that performs the steps of:

receiving, at a financial ledger, a first request for a financial obligation associated with a user and a first entity, wherein the financial ledger is on a node of a network comprising a plurality of nodes and wherein each of the plurality of nodes is associated with a different entity;

the financial ledger being shared and replicated among the plurality of nodes;

receiving, at substantially the same time as the first request for a financial obligation and at the financial ledger, a validation rule associated with the first request for a financial obligation, wherein the validation rule comprises at least one financial condition associated with the user with respect to the first request and wherein the validation rule is generated by the entity associated with the first request;

automatically replicating, in response to receipt of the first transaction and the validation rule at the ledger, the validation rule throughout the plurality of nodes;

receiving a second request for a financial obligation associated with the user and a second entity for input to the financial ledger;

comparing the received second request to the validation rule, wherein the comparing comprises identifying if the at least one financial condition is fulfilled; and approving the second request if the validation rule is upheld.

\* \* \* \* \*